US011029414B2

(12) United States Patent
Hsieh et al.

(10) Patent No.: US 11,029,414 B2
(45) Date of Patent: Jun. 8, 2021

(54) ELECTRONIC DEVICES AND METHODS FOR PROVIDING LOCATION INFORMATION

(71) Applicant: CM HK LIMITED, Fortress Hill (HK)

(72) Inventors: Yun-Chia Hsieh, Taipei (TW); Kuo-Ting Hu, Taipei (TW); Yu-Kuen Tsai, Taipei (TW); Ching-Lin Hsieh, Taipei (TW); Chien-Chih Hsu, Taipei (TW)

(73) Assignee: CM HK LIMITED, Fortress Hill (HK)

( * ) Notice: Subject to any disclaimer, the term of this patent is extended or adjusted under 35 U.S.C. 154(b) by 504 days.

(21) Appl. No.: 15/619,607

(22) Filed: Jun. 12, 2017

(65) Prior Publication Data

US 2017/0276797 A1 Sep. 28, 2017

Related U.S. Application Data

(63) Continuation-in-part of application No. 15/430,607, filed on Feb. 13, 2017, now Pat. No. 10,845,452.
(Continued)

(30) Foreign Application Priority Data

May 8, 2013 (CN) .......................... 201320245496.X

(51) Int. Cl.
*G01S 19/34* (2010.01)
*H04W 4/029* (2018.01)
(Continued)

(52) U.S. Cl.
CPC .............. *G01S 19/34* (2013.01); *G01C 21/14* (2013.01); *G01C 22/006* (2013.01); *G01D 3/10* (2013.01);
(Continued)

(58) Field of Classification Search
CPC ......... G01S 19/34; H04W 4/029; G01C 21/14
See application file for complete search history.

(56) References Cited

U.S. PATENT DOCUMENTS 4,965,550 A 10/1990 Wroblewski
5,355,503 A 10/1994 Soffel et al.
(Continued)

FOREIGN PATENT DOCUMENTS

CN 101911048 A 12/2010
CN 103229568 A 7/2013
(Continued)

OTHER PUBLICATIONS

Dippold, Personal Dead Reckoning with Accelerometers, Apr. 16, 2006, pp. 1-6 (Year: 2006).*
(Continued)

*Primary Examiner* — Lisa E Peters
(74) *Attorney, Agent, or Firm* — McClure, Qualey & Rodack, LLP

(57) ABSTRACT

Electronic devices and methods for providing location information are provided, of which a representative method includes: generating sensor readings corresponding to sensed motion of the electronic device; determining a reference location information; computing a GPS-fused location information based on the reference location information and the sensor readings; generating a GPS-required event based on a change of the GPS-fused location information; generating a GPS-not-required event responsive to the reference location information being determined; receiving the GPS-fused location information and one of either the GPS-required event or the GPS-not-required event; responsive to the GPS-required event being received, operating the GPS receiver in a location information-acquiring mode during which the GPS receiver generates geographical location readings; and responsive to the GPS-not-required event
(Continued)

being received, operating the GPS receiver in a power-saving mode during which the GPS receiver is deactivated.

21 Claims, 9 Drawing Sheets

Related U.S. Application Data which is a continuation-in-part of application No. 15/357,176, filed on Nov. 21, 2016, now Pat. No. 9,885,734, which is a continuation-in-part of application No. 14/088,452, filed on Nov. 25, 2013, now Pat. No. 9,534,927, which is a continuation-in-part of application No. 13/945,930, filed on Jul. 19, 2013, now Pat. No. 9,798,390, and a continuation-in-part of application No. 14/033,553, filed on Sep. 23, 2013, now Pat. No. 9,104,417.

(60) Provisional application No. 62/362,553, filed on Jul. 14, 2016, provisional application No. 62/340,523, filed on May 24, 2016.

(51) Int. Cl.
| | |
|---|---|
| H04W 52/02 | (2009.01) |
| H04W 4/02 | (2018.01) |
| G01C 22/00 | (2006.01) |
| G01D 3/10 | (2006.01) |
| G01S 5/02 | (2010.01) |
| G01S 19/46 | (2010.01) |
| G01S 19/13 | (2010.01) |
| G01C 21/14 | (2006.01) |
| G01S 19/49 | (2010.01) |

(52) U.S. Cl.
CPC ............ *G01S 5/021* (2013.01); *G01S 5/0263* (2013.01); *G01S 19/13* (2013.01); *G01S 19/46* (2013.01); *G01S 19/49* (2013.01); *H04W 4/027* (2013.01); *H04W 4/029* (2018.02); *H04W 52/0254* (2013.01)

(56) References Cited

U.S. PATENT DOCUMENTS

| 6,256,746 | B1 | 7/2001 | Cheng |
| 6,557,107 | B1 | 4/2003 | Kim |
| 7,000,469 | B2 | 2/2006 | Foxlin et al. |
| 8,738,031 | B2 | 5/2014 | MacGougan et al. |
| 9,104,417 | B2 | 8/2015 | Ye et al. |
| 9,811,174 | B2 | 11/2017 | Nasiri et al. |
| 2001/0024172 | A1* | 9/2001 | Ito ........................ G01C 21/26 |
| | | | 342/357.32 |
| 2004/0149036 | A1* | 8/2004 | Foxlin ................... A61B 5/1113 |
| | | | 73/511 |
| 2007/0113286 | A1 | 5/2007 | Cromer et al. |
| 2008/0238772 | A1 | 10/2008 | Soloviev et al. |
| 2009/0184849 | A1 | 7/2009 | Nasiri et al. |
| 2009/0265671 | A1 | 10/2009 | Sachs et al. |
| 2011/0102257 | A1* | 5/2011 | Spyropoulos ............ G01S 19/34 |
| | | | 342/357.31 |
| 2011/0109330 | A1 | 5/2011 | Ikuta et al. |
| 2011/0163955 | A1 | 7/2011 | Nasiri et al. |
| 2011/0215903 | A1 | 9/2011 | Yang et al. |
| 2012/0022844 | A1 | 1/2012 | Teixeira |
| 2012/0277545 | A1 | 11/2012 | Texeira |
| 2013/0102268 | A1* | 4/2013 | Wang ...................... G01S 19/34 |
| | | | 455/343.2 |
| 2013/0237248 | A1 | 9/2013 | Park et al. |
| 2013/0244686 | A1* | 9/2013 | Saha ....................... G01S 19/34 |
| | | | 455/456.1 |
| 2013/0282275 | A1 | 10/2013 | Park et al. |
| 2013/0316725 | A1* | 11/2013 | MacGougan ..... H04W 52/0251 |
| | | | 455/456.1 |
| 2014/0094198 | A1* | 4/2014 | Heo ................... H04W 52/0274 |
| | | | 455/456.4 |
| 2014/0136871 | A1 | 5/2014 | Jung et al. |
| 2014/0145860 | A1* | 5/2014 | Park ......................... H04Q 9/00 |
| | | | 340/870.16 |
| 2014/0244156 | A1* | 8/2014 | Magnusson ............ G01C 21/34 |
| | | | 701/418 |
| 2015/0099546 | A1* | 4/2015 | Heo ........................ G01S 19/48 |
| | | | 455/456.3 |
| 2015/0233714 | A1* | 8/2015 | Kim ....................... G01C 17/38 |
| | | | 33/356 |

FOREIGN PATENT DOCUMENTS

| CN | 103428362 A | 12/2013 |
| TW | I437418 B | 5/2014 |

OTHER PUBLICATIONS

Son et al, Design and Implementation of Low-power Location Tracking System Based on IEEE 802.11, 2014, IEEE DOI 10.1109/HPCC.2014.117, pp. 562-565 (Year: 2014).*
Soloviev et al., Utilizing Multipath Reflections in Deeply Integrated GPS/INS Architecture for Navigation in Urban Environments, 2008 IEEE, pp. 383-393.
Jia, Ning. "Fall Detection Application by Using 3-Axis Accelerometer ADXL345". Analog Devices. AN-1 023 Application Note. Copyright 2009. Availabile: http:/ /blog.ednch ina.geo.eet-en.com/uploadedn/Biog/2009/7/1/32909b38-5e 12-4a32-bd7 e-19e75256ed35.pdf.
Chinese language office action dated Mar. 11, 2020, issued in application No. CN 201710569999.5.

* cited by examiner ns of the electronic apparatus 100 can also be positioned
ELECTRONIC DEVICES AND METHODS FOR PROVIDING LOCATION INFORMATION

CROSS REFERENCE TO RELATED APPLICATIONS

This utility application is based on and claims priority to U.S. provisional application 62/362,553, filed on 14 Jul. 2016, and is a continuation-in-part application, which is based on and claims priority to U.S. application Ser. No. 15/430,607, filed on 13 Feb. 2017. U.S. application Ser. No. 15/430,607 is based on and claims priority to U.S. provisional application 62/340,523, filed on May 24, 2016, and is a continuation-in-part application, which is based on and claims priority to U.S. application Ser. No. 15/357,176, filed on Nov. 21, 2016. U.S. application Ser. No. 15/357,176 is a continuation-in-part application of and claims the priority benefit of U.S. application Ser. No. 14/088,452, filed on Nov. 25, 2013 (now U.S. Pat. No. 9,534,927), which is a continuation-in-part application of and claims the priority benefit of U.S. application Ser. No. 13/945,930, filed on Jul. 19, 2013, and which is also a continuation-in-part application of and claims the priority benefit of U.S. application Ser. No. 14/033,553, filed on Sep. 23, 2013 (now U.S. Pat. No. 9,104,417). U.S. application Ser. No. 14/033,553 claims the priority benefit of China application 201320245496.X, filed on May 8, 2013. The entirety of each of the above-mentioned patent applications is hereby incorporated by reference herein and made a part of this specification.

TECHNICAL FIELD

This application involves the use of absolute positioning and relative positioning techniques, such as for use in mobile devices.

DESCRIPTION OF THE RELATED ART

Absolute positioning techniques, such as global positioning system (GPS), Wi-Fi, and proximity tagging, provide reliable and accurate location information, and yet updating such information at a maximum possible rate may draw significant power and may not guarantee full coverage. Relative positioning techniques, such as pedestrian dead reckoning (PDR), estimate a current position of a user device based upon a previously determined position by using its inertial sensors and work even in an environment where absolute location information is not available, and yet the estimated current position is subject to cumulative errors.

Notably, a mobile device is often equipped with embedded sensors (such as an accelerometer, a gyro-sensor and a magnetometer) that may be used for performing relative positioning techniques. A central processing unit (CPU) of the mobile device can collect samples generated by the sensors and perform some processing based on the samples. For example, the CPU can calculate the movement and the orientation of the mobile device or calculate how many steps the user of the mobile device has walked.

Since the sensors keep generating samples, the CPU has to receive and analyze the samples constantly. Therefore, the CPU has to be in its full operation mode for extended periods of time, which consumes electric power and shortens the battery life of the mobile device.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
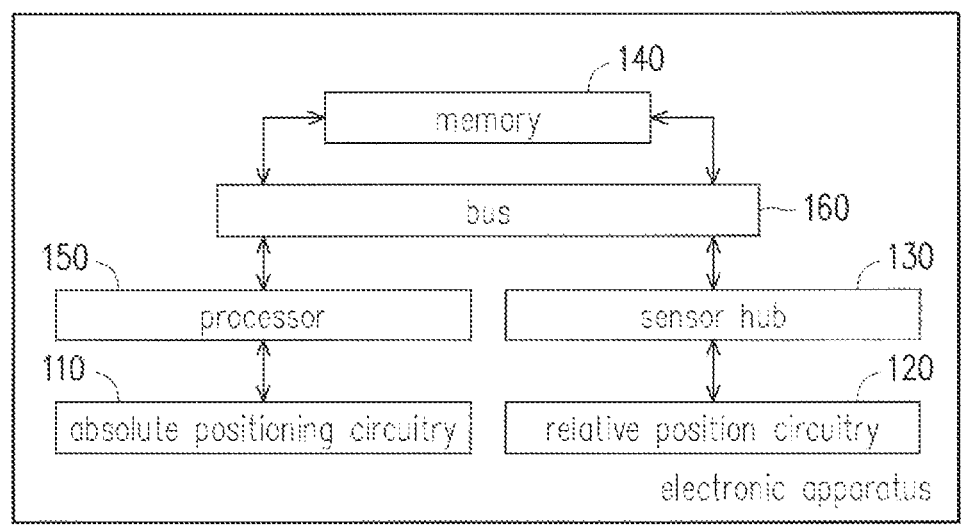
FIG. 1 is a schematic diagram of an exemplary embodiment of an electronic device.

Some embodiments will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Absolute positioning techniques such as global positioning system (GPS), Wi-Fi, and proximity tagging provide reliable and accurate location information, and yet updating such information at a maximum possible rate may draw significant power and may not guarantee full coverage. Relative positioning techniques such as pedestrian dead reckoning (PDR) estimate a current position of a user device based upon a previously determined location by using its motion sensors such as inertial sensors and work even in an environment where absolute location information may not be available, and yet the estimated current position can be subject to cumulative errors. Advantages of the proposed method include maximizing accuracy and coverage for positioning while keeping power consumption to a minimum through the integration of the two aforesaid location information services.

FIG. 1 illustrates a proposed electronic apparatus in accordance with one of the exemplary embodiments of the disclosure. All components of the electronic apparatus and their configurations are first introduced in FIG. 1. The functionalities of the components are disclosed in more detail in conjunction with FIG. 2.

Referring to FIG. 1, for exemplary purposes, an electronic apparatus 100 at least includes an absolute positioning circuitry 110, a relative positioning circuitry 120, a sensor hub 130, a memory 140, a processor 150, and a data bus 160. Herein, the sensor hub 130 can be coupled to the relative position circuitry 120, the memory 140, and the processor 150 through the data bus 160. The processor 150 can be coupled to the absolute positioning circuitry 110, the sensor hub 130, and the memory 140 through the data bus 160. The electronic apparatus 100 can be a standalone apparatus such as a smart phone, a tabular computer, a person digital assistant (PDA), a smart watch, and so forth. The components of the electronic apparatus 100 can also be positioned separately and connected to each other wirelessly. For example, at least one of the absolute positioning circuitry 110 and the relative positioning circuitry 120 can be mounted on wearable devices while the processor 150 can be positioned in a remote monitor such as a smartphone. The electronic apparatus 100 can also be a vehicle built-in apparatus.

The absolute positioning circuitry 110 may sample location readings including readings from a GPS receiver that receives GPS satellite radio signals from a GPS satellite constellation via antennas. The absolute positioning circuitry 110 can pass the location readings to the processor 150 so that the processor can report current location information based on the location readings. The absolute positioning circuitry 110 can also return the location information directly to the processor 150 based on the sampled location readings. The absolute positioning circuitry 110 can dynamically change the sampling rate for the location readings under the control of the processor 150. The absolute positioning circuitry 110 can provide location readings including readings from a communication module can indicating the current location information of the electronic apparatus 100 wirelessly through a network.

The relative positioning circuitry 120 can include motion sensors such as inertial sensors that detect events or changes in its position, and provide a corresponding output in a relative basis. For exemplary purposes, in the present embodiment, the relative positioning circuitry 120 may provide sensor readings including readings from at least one of an accelerometer, a gyroscope, a magnetometer, a pedometer, a barometer, a light sensor, a force sensor, a sound pressure sensor, or a radio receiver coupled to a sampling circuitry. The sampling circuitry samples strength of radio RF signals of a signal source that is detectable at the portion of a transit system. The signal source can be a cell site of a cellular communications network, a wireless access point, or a Bluetooth low energy (BLE) beacon. The sensor readings can include information about a rate of acceleration and deceleration, a motion speed, a change of direction, and/or a rate of direction change regarding to the electronic apparatus 100. For example, a three-axis accelerometer can output acceleration data corresponding to each axis in response to any detection of a sudden movement when the electronic apparatus 100 encounters an external force. A gyroscope can detect a rotational movement of the electronic apparatus 100 rotating about a particular axis in space and output data representing the rotational movement. A combination of the accelerometer and the gyroscope may create a more accurate measurement of an overall movement and orientation of the electronic apparatus 100.

The sensor hub 130 can be formed by a microcontroller having a programmable microcontroller core, a memory, and an interface for connecting itself to the processor 150 as well as another interface, such as a serial peripheral interface bus (SPI) or inter integrated circuits (I2C), for connecting itself to the relative positioning circuitry 120. The sensor hub 130 can also be formed by a microcontroller with external memory and interface circuitry. The sensor hub 130 is configured to integrate and process real-time data with relatively low-power consumption. The sensor hub 130 can listen the sensor readings dynamically or periodically and provide a relative location information which can include an estimated moving distance and an estimated rotating angle. The estimated moving distance can refer to a step length, and the estimated rotating angle can refer to an angle between the current heading direction and the previous heading direction of the electronic apparatus 100. Based on the relative location information from the relative positioning circuitry 120 and the geographical location previously obtain by the processor 150, the sensor hub 130 can report an estimated location information, which can include an estimated location and an estimated heading direction location information of the electronic apparatus 100.

The memory 140 can include various forms of non-transitory, volatile, and non-volatile memories such as one or a combination of a stationary or mobile random access memory (RAM), a read-only memory (ROM), a flash memory, a hard drive or other similar devices or interfaces. The memory 140 can store an operating system and application programs to operate the electronic apparatus 100 as well as real-time data collected from relative positioning circuitry 120.

The processor 150 is configured to integrate and process data obtained from the absolute positioning circuitry 110 and the sensor hub 130 so as to perform a hybrid positioning method. The processor 150 can determine location information indicating the last known location obtained from a given location provider such as the absolute positioning circuitry 110 or the sensor hub 130. The processor 150 can develop a traveling trace based on the last known location and a plurality of estimated location and/or estimated heading direction for each consecutive step periodically reported by the sensor hub 130. The processor 150 can include one or more of a North Bridge, a South Bridge, a field programmable array (FPGA), a programmable logic device (PLD), an application specific integrated circuit (ASIC), or other similar device or a combination thereof. The processor 150 may also include a central processing unit (CPU), a programmable general purpose or special purpose microprocessor, a digital signal processor (DSP), an application processor, a baseband processor, a wireless processor, an application specific integrated circuit (ASIC), a programmable logic device (PLD), or other similar devices or a combination thereof.

Figure 2:
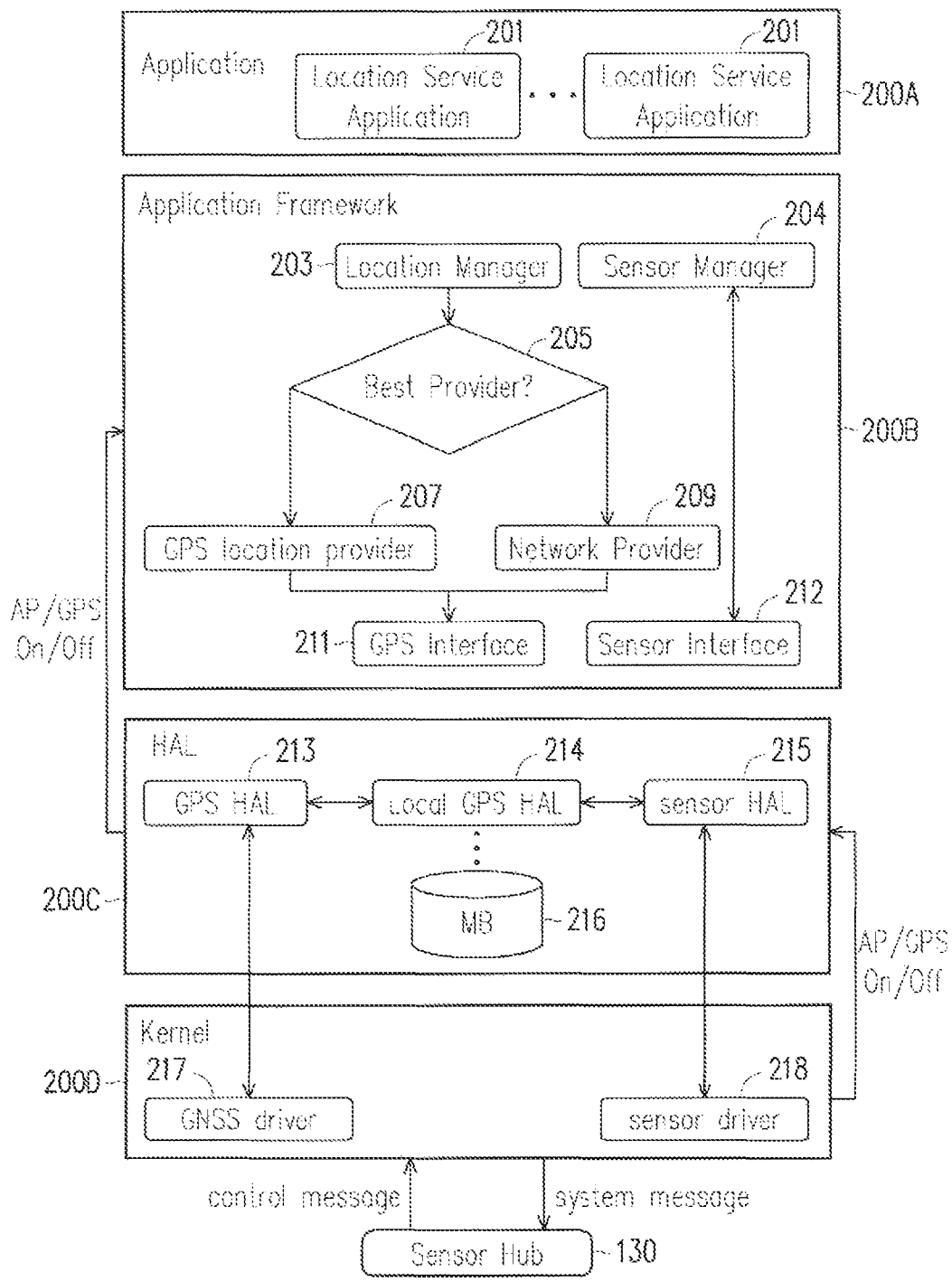
FIG. 2 is a schematic diagram depicting functionality of an exemplary embodiment.

FIG. 2 illustrates a functional block diagram capable of performing a hybrid location positioning method from a software stack perspective in accordance with one of the exemplary embodiments of the disclosure. For exemplary purposes, Google Map in Android OS can be demonstrated.

Referring to FIG. 1 in conjunction with FIG. 2, the software operation system architecture mainly includes an application layer 200A, an application framework layer 200B, a hardware abstraction layer (HAL) 200C, and a kernel layer 200D.

The application layer 200A can include various applications and at least one location service application 201. Herein, Google Map 201 can be the exemplary application. Besides, additional location service applications can also be invoked to request location information when one of the at least one location service application 201 has been invoked. The invoked at least one location service application will request location information from a location manager 203 of the application framework layer 200B.

The application framework layer 200B is used most often by application developers to access framework application programming interfaces (APIs) and manage the basic functions of the electronic apparatus 100 on which Android is executed. The application framework layer 200B can include various managers including a location manager 203 which provides location information, such as a location fix, to the at least one location service program. The application framework layer 200B can include multiple location providers, which can receive location readings and determine the location information of the electronic apparatus 100. The location manager 203 can select the best location provider 205 between a GPS location provider 207 and a network location provider 209, which are the two main location providers in Android. The selection can be based on availability, battery consumption, user settings, commands from other layer of the software operation system architecture and so forth. The location manager 203 can calculate the location information based on location data provided by the selected one of the GPS location provider 207 and a network location provider 209. The location data can comprise information about latitude, longitude, accuracy and etc. of the electronic apparatus 100. The location information calculated based on location data obtained from either the GPS location provider 207 or the network location provider 209 can be passed to the HAL 200C through a GPS interface 211. The location manager 203 can register an update rate at which the GPS location provider 207 and the network location provider 209 report location data. The update rate can be determined based on request from the sensor hub 130 or the invoked at least one of the location service applications 201. The invoked at least one of the location service application 201 can register a regular update rate if the sensor hub 130 does not enable the hybrid positioning method or PDR algorithm to update estimated location information. On the other hand, the location manager 203 can register a full update rate if the hybrid positioning method is performed, while the full update rate is higher than the regular update rate. The full update rate can also be a fastest rate the GPS location provider 207 can support. The location manager 203 can compute a traveling trace based on a plurality of estimated location and/or estimated heading direction which can be provided by a sensor manager 204 of the framework layer 200B for each consecutive step.

The framework layer 200B can include a sensor manager 204. The sensor manager 204 can connect to the sensor hub 130 through a sensor interface 212, the HAL 200C, and then the Kernel 200D. The sensor manger can receive a control message from the sensor hub 130. Based on the control message, the sensor manager 204 can pass a suspend command to the location manager 203. In response to the suspend command, the location manager 203 can decrease update frequency of the location data from the location providers and/or the location readings from the absolute positioning circuitry 110. Particularly, in response to the suspend command, the location manager 203 can instruct the GPS location provider to stop listening location readings while not turn off the absolute positioning circuitry. The sensor manager 204 can also generate a sleep mode command based on the control message. In response to the sleep mode command, the processor 150 can enter the sleep mode.

The HAL 200C includes a number of libraries and defines a standard interface for hardware vendors to implement and allows Android to be agnostic about lower-level driver implementations as previously described. Once the location information is passed to a GPS HAL 213, a pre-registered GPS share memory HAL 214 can gather the information of latitude, longitude, and accuracy and stored the information into a memory block MB 216 of the memory 140.

Besides, the processor 150 can enable sensors manager 204 to retrieve sensor readings from the relative positioning circuitry 120. The sensor readings can be retrieved from a sensor HAL 215 through a sensor interface 212 in the application framework layer 200B.

The GPS HAL 213 can retrieve location readings from the absolute positioning circuitry 110. The retrieved location readings can be raw GPS data which comprises GPS measurement. The location readings can be complied and then delivered to the GPS location provider 207 by the GPS HAL 213. The GPS location provider 207 can calculate and report the location data based on the delivered location readings, while the location data is processed by the location manager 203 to determine the location information. The location information can be feed back to the GPS HAL 213.

The GPS share memory HAL 214 can be considered as a bridge between the GPS HAL 213 and the sensor HAL 215. The GPS share memory HAL 214 can access the location information feed back to the GPS HAL 213 and store the location information into the memory block MB. Besides, the GPS share memory HAL 214 can retrieve the stored location information from the memory block MB 216 and pass the location information to the sensor HAL 215 in response to request from the sensor HAL 215. The GPS share memory HAL can compile the retrieved location data so that the compiled location data can be readable to the sensor HAL 215.

The kernel layer 200D including individual device drivers such as Global Navigation Satellite System (GNSS) driver 217 and a sensor driver 218 is adapted to interact with individual hardware components of the electronic apparatus 100. The kernel layer 200D can obtain the location information through the sensor HAL 215 and pass the location information to the sensor hub 130 as a system message.

The sensor hub 130 can determine whether the electronic apparatus satisfies a location update condition. The location update condition could be associated with a travelling distance of the electronic apparatus 100 from a location where the absolute positioning device 110 was previously enabled, a cumulative time that the electronic apparatus 100 has not been traveling, a moving direction of the electronic apparatus 100, and etc. The location update condition can be determined based upon the sensor readings from the relative positioning circuitry 120.

If the location update condition is not satisfied, the sensor hub 130 can continuously estimate the current estimated location information based on PDR algorithm. On the other hand, when the sensor hub 130 determined that the location update condition is satisfied, the sensor hub 130 can request the location manager 203 to update location information at the full update rate. Accordingly, the location manager 203 can request location data from the selected one of the GPS location provider 207 and the network location provider 209.

The sensor hub 130 can determine whether the updated location information satisfies the disable condition. The disable condition is determined based upon the reliability of the updated location information. If multiple updated location information computed and obtained by the location manager 203 within a certain time frame corresponds to a set of close/converged geographical locations, it indicates that the updated location information is reliable, and the absolute positioning circuitry 110 is thus stable. Once the disable condition is satisfied, the sensor hub 130 can transmit a control message to the location manager 203 via the sensor HAL 215 and the sensor manager 204, where the control message indicates whether or not to suspend the GPS service. If the location data satisfies the disable condition, the location manager 203 can turn off the GPS service for power saving purposes.

Figure 3:
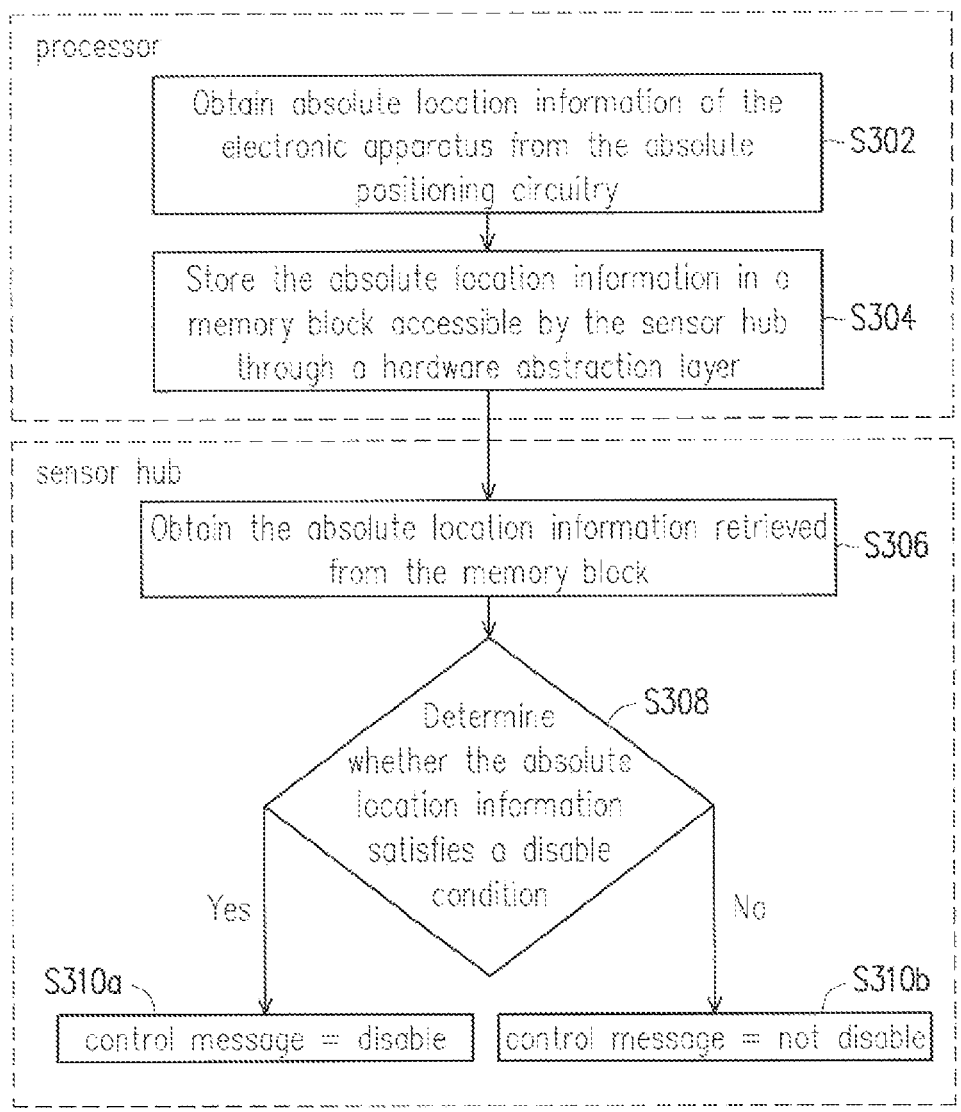
FIG. 3 is a schematic diagram depicting functionality of another exemplary embodiment.

FIG. 3 illustrates a flowchart of a proposed method for providing a hybrid location information service in accordance with one of the exemplary embodiments of the disclosure. The steps of FIG. 3 can be implemented by the proposed electronic apparatus 100 as illustrated in FIG. 1 in conjunction with FIG. 2.

Referring to FIG. 1 in conjunction with FIG. 2. Once the hybrid positioning method starts, the location manager 203 can first report absolute location information of the electronic apparatus 100 based on location readings of the absolute positioning circuitry 110 (Step S302). The absolute location information can include a geographical location and a geographical heading direction of the electronic apparatus 100. In step 304, the processor 150 can store the absolute location information in a memory block of the memory 140 accessible by the sensor hub 130 through a hardware abstraction layer (HAL) which consists of interface functions. The location manager 203 will instruct the absolute positioning circuitry 110 to consecutively report the location reading in the full update rate. The location manager 203 can listen and compute the reported location reading and obtain a series of geographical locations over a time frame. The series of geographical location can be stored in the memory block MB 216. In step 306, the sensor hub 130 can obtain the absolute location information retrieved from the memory block.

In step 308, the processor 150 can determine whether the absolute location information satisfies a disable condition. The disable condition is determined based upon the reliability of the absolute location information. The sensor hub 130 can determine whether the series of geographical location stored in the memory block MB 216 is closed to each other or converged. If a set of close/converged geographical locations is determined, the sensor hub 130 can conclude the location information is reliable and report the last one of the series of geographical location as a current location. Once the current location is determined, the sensor hub 130 can determine that the absolute location information satisfies the disable condition and send a control message to disable the GPS service (Step 310a). If any obtained geographical location is way off as compared to other geographical location obtained within a certain time frame, it can be an error impacted by temporary interferences or noises and cannot be considered as a stable geolocation measurement. Accordingly, the sensor hub 130 can determine that the absolute location information does not satisfy the disable condition and send a control message indicating not disable the GPS service (Step 310b).

If the sensor hub 130 determines that the absolute location information satisfies the disable condition, the control message sent by the sensor hub 130 can also include a sleep reference message. The sleep reference message indicate that the processor 150 can enter into a sleep mode or a low power mode. In other embodiments, the processor 150 can also stop requesting or reduce the frequency of sampling location readings from the absolute positioning circuitry 110 once it receives the disable control message.

It should be noted that, after the processor 150 disables the absolute positioning circuitry 110, the sensor hub 130 or the processor 150 can compute estimated location information to develop a traveling trace of the electronic apparatus 100 based on pedestrian dead reckoning (PDR) algorithm. PDR algorithm involves calculating the current estimated location information based upon relative location information obtained from the relative positioning circuitry 120 and the previous absolute location information. As a result, a comparably less power consumption can be achieved.

Other features and/or combinations of features will now be described with respect to several additional embodiments. It should be noted that one or more of the features described in the following may be incorporated into other embodiments, such as those previously described, as alternative features and/or as additional features.

Figure 4:
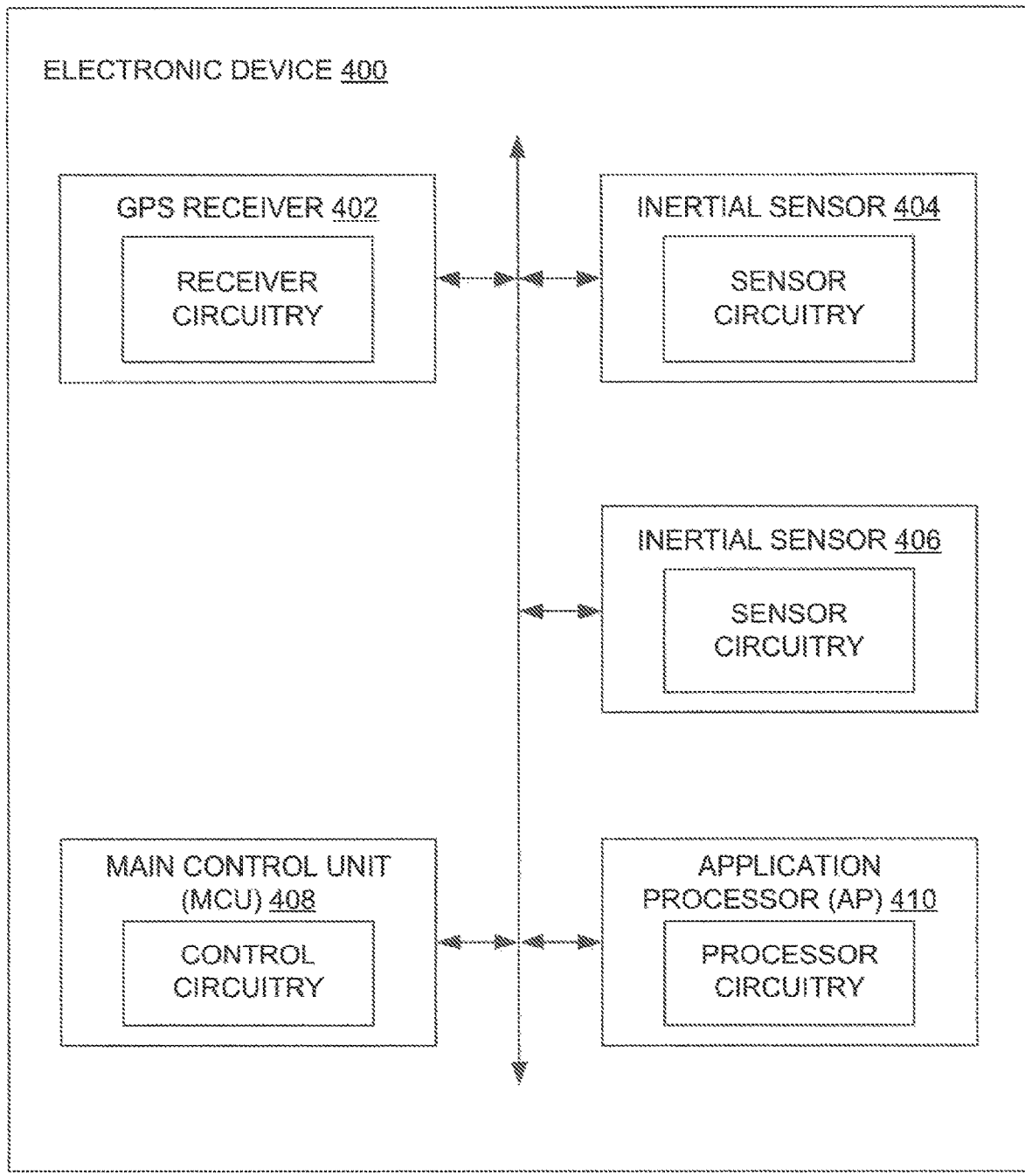
FIG. 4 is a schematic diagram of another exemplary embodiment of an electronic device.

In this regard, FIG. 4 is a schematic diagram of another exemplary embodiment of an electronic device. As shown in FIG. 4, electronic device 400 (e.g., a mobile device) incorporates a GPS receiver 402, inertial sensors (e.g., sensor 404, 406), a main controller (otherwise referred to herein as "a main control unit") (MCU) 408, and an application processor (AP) 410. GPS receiver 402 includes receiver circuitry and is configured to switch between a location information-acquiring mode, during which the GPS receiver generates geographical location readings, and a power-saving mode, during which the GPS receiver is deactivated. Each of the inertial sensors incudes sensor circuitry and is configured to generate sensor readings corresponding to sensed motion of the electronic device.

MCU 408 includes control circuitry and is configured to perform several functions. In particular, MCU 408 is configured to: determine reference location information; compute GPS-fused location information based on the reference location information and the sensor readings; generate a GPS-required event based on a change of the GPS-fused location information; and, generate a GPS-not-required event responsive to the reference location information being determined as unchanged. In some embodiments, the MCU is further configured to generate event package data, which includes the GPS-fused location information and one of the GPS-required event or the GPS-not-required event. In some of these embodiments, after the MCU adds the GPS-required event to the event package data, the associated AP may be configured to inject a sequence of geographical readings to the MCU at a fastest rate designated by the AP. It should be noted that an associated GPS receiver may be capable of supporting a rate higher than the fastest rate designated by the AP). It should be noted that functionality associated with an MCU may be embedded within the component(s) (e.g., the semiconductor chip(s)) used to provide a CPU in some embodiments.

AP 410 includes processor circuitry and also is configured to perform several functions. In particular, AP 410 is configured to: receive the GPS-fused location information and one of either the GPS-required event or the GPS-not-required event; responsive to the GPS-required event being received, operate the GPS receiver in the location information-acquiring mode to generate the geographical location readings; and, responsive to the GPS-not-required event being received, operate the GPS receiver in the power-saving mode. In some embodiments, AP 410 is further configured to: selectively request one of the GPS-fused location information or GPS location information (such as by requesting the event package data); and perform a location service process to switch the GPS receiver between the power-saving mode and the location information-acquiring mode based on the received one of the GPS-required event and the GPS-not-require event extracted from the event package data. Specifically, if the GPS-required event is extracted from the event package data, in some embodiments, AP 410 may acquire the geographical location readings from the GPS receiver. Notably, the geographical location readings may incorporate one or more of latitude readings, longitude readings, and accuracy readings.

In response to the GPS-fused location information being received, AP 410 may perform a sensor service process to inform the MCU to compute the GPS-fused location information and generate a first ID associated with identification of the GPS-fused location information. Thereafter, AP 410 may obtain the GPS-fused location information and the selected one of the GPS-required event and the GPS-not-required event. In contrast, in response to the GPS location information being received, AP 410 may perform the location service process to acquire the geographical location readings from the GPS receiver to generate the GPS location information at a dynamic rate. AP 410 may then select one of the GPS-fused location information and the GPS location information as location output.

With respect to a sensor service process, if the GPS-require event is extracted from the event package data, some embodiments are configured to: inform the location service process to operate the GPS receiver in the location information-acquiring mode to generate the geographical location readings at the fastest rate. Thereafter, the AP may pass the geographical location readings to the MCU so that the MCU may generate the reference location information based on the geographical location readings, and add the GPS-not-required event to the event package data. However, if the GPS-not-required event is extracted from the event package data, the sensor service process may be configured to operate the GPS receiver in the power-saving mode.

Figure 5:
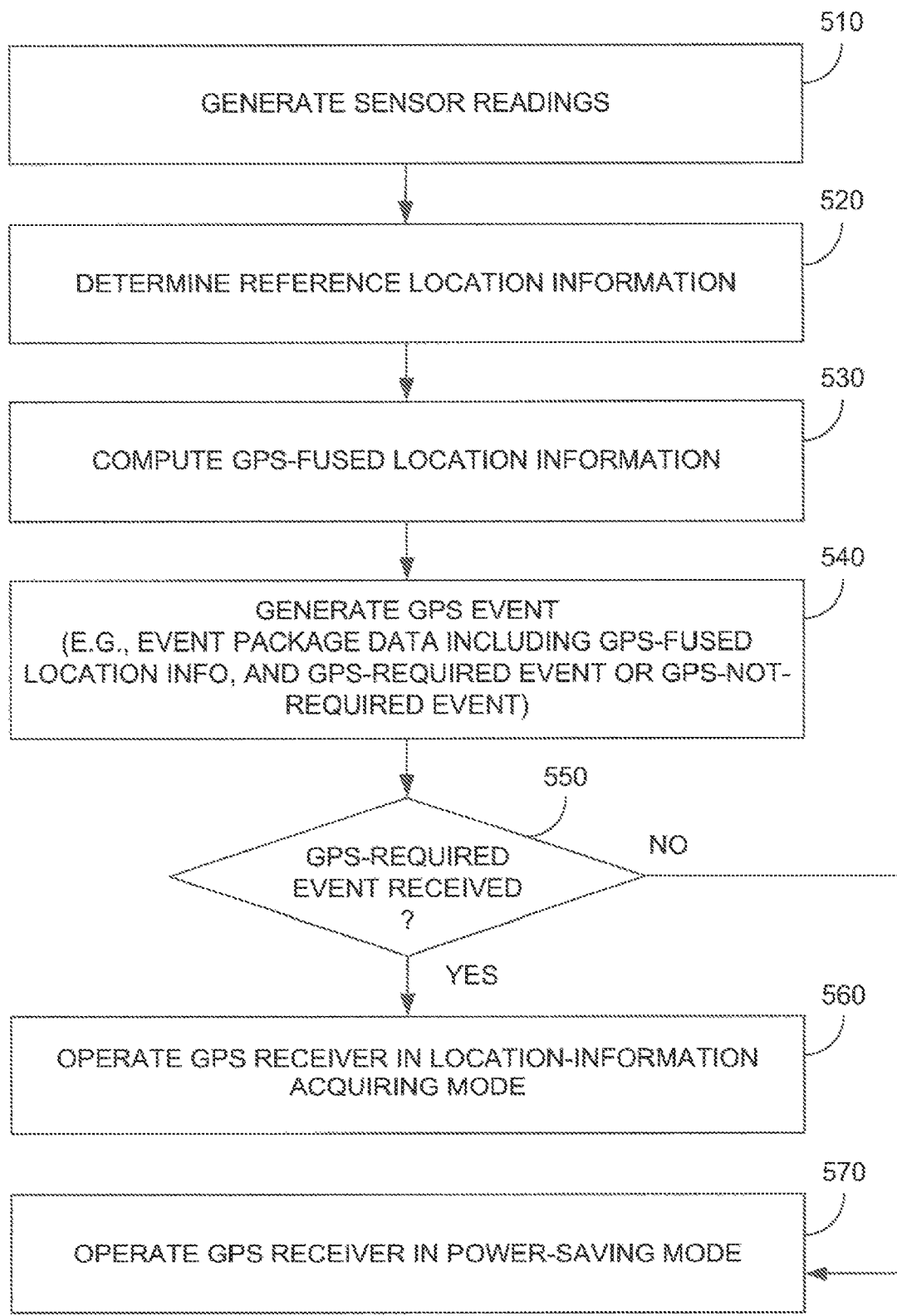
FIG. 5 is a flowchart depicting an exemplary embodiment of a method.

FIG. 5 is a flowchart depicting an exemplary embodiment of a method, which may correspond to functionality exhibited by electronic device 400 of FIG. 4. As shown in FIG. 5, method 500 may be construed as beginning a block 510, in which sensor readings corresponding to sensed motion of an electronic device are generated. In particular, the sensor readings may be generated by inertial sensors carried by the electronic device. In block 520, reference location information is determined. In some embodiments, reference location information may be determined by an MCU based on geographical location readings provided by a GPS receiver. By way of example, in some embodiments, variance among multiple processed GPS locations (e.g., 5 locations) may be calculated and, if the calculated variance is smaller than a threshold, the most recent GPS location may be adopted as the reference location for the reference location information. As another example, the MCU may be configured to determine the reference location information in responsive to determining that geographical location readings are converging.

In block 530, GPS-fused location information may be computed by the MCU based on the reference location information and the sensor readings. In some embodiments, this may involve the use of a PDR algorithm for calculating a current estimated location information based upon previous absolute location information (the reference location information) and relative location information (information based on the sensor readings). Then, as depicted in block 540, a GPS event (which may serve as a control message for determining an operating mode of the GPS receiver) is generated by the MCU. In some embodiments, the GPS event may include a GPS-required event, which is based on a change of the GPS-fused location information, and a GPS-not-required event, which is generated responsive to the reference location information being determined as unchanged.

In block 550, the GPS-fused location information and one of either the GPS-required event or the GPS-not-required event are received by the AP. If the GPS-required event is received, the process proceeds to block 560, in which the GPS receiver is operated in a location information-acquiring mode and generates geographical location readings. In some embodiments, this may involve generating the geographical location readings at a dynamic rate (e.g., a fastest rate designated by the AP). If the GPS-not-required event is received, the process proceeds to block 570, in which the GPS receiver is operated in a power-saving mode (i.e., the GPS receiver is deactivated).

Figure 6:
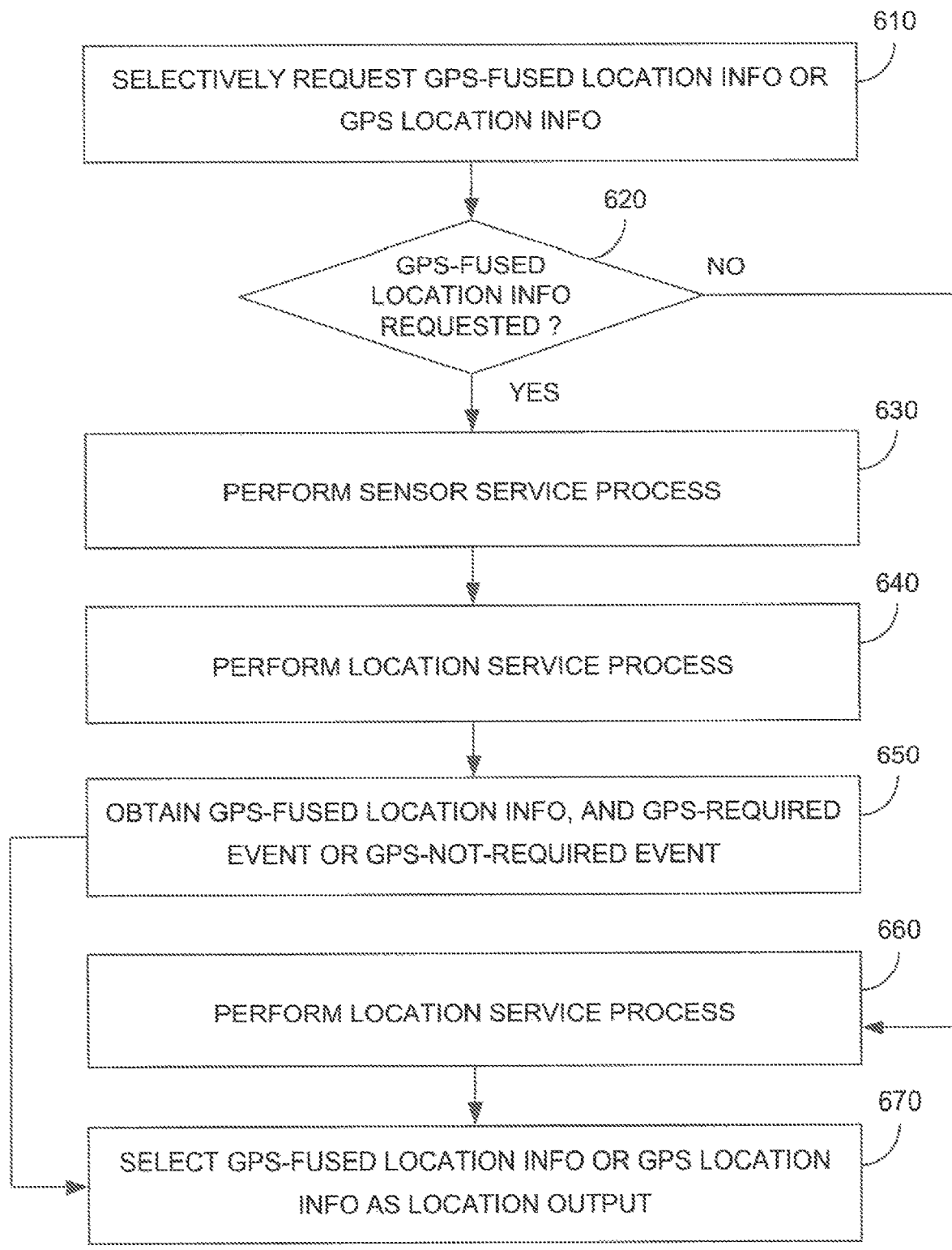
FIG. 6 is a flowchart depicting another exemplary embodiment of a method.

FIG. 6 is a flowchart depicting another exemplary embodiment of a method, which corresponds to functionality exhibited by an embodiment of an AP. As shown in FIG. 6, method 600 may be construed as beginning a block 610, in which one of GPS-fused location information or GPS location information is selectively requested by an AP. The AP selectively request one of the GPS-fused location information or the GPS location information based on different type of application programs activated by a user. For example, when a map application (like GOOGLE® Maps) is activated, GPS location information may be requested. When a hybrid location tracking application program is activated by the user, the GPS-fused location information may be requested. Then, in block 620, a determination is made regarding whether GPS-fused location information or GPS location information is requested. If GPS-fused location information is requested, the process proceeds to block 630, in which a sensor service process is performed by the AP to inform the MCU to compute the GPS-fused location information.

In block 630, a first ID associated with identification of the GPS-fused location information is assigned by the sensor service process to the MCU. Recall that event package data incorporating GPS-fused location information and one of the GPS-required event or the GPS-not-required event may be generated by an associated MCU. The MCU may add the first ID into the event package data in response to the assignment of the first ID. Accordingly, the AP can identify the GPS-fused location information.

After block 630, a location service process is performed to switch an associated GPS receiver between the power-saving mode and the location information-acquiring mode (block 640). The switching may be performed by the AP based on a GPS-required event or GPS-not-require event depending upon which is extracted from the event package data received from the MCU. In some embodiments, AP performs the sensor service process to extract one of the GPS-required event or the GPS-not-required event from the event package data. In response, performing the sensor service process may include informing the location service process to operate the GPS receiver in the location information-acquiring mode if the GPS-require event is extracted from the event package data. This may be performed to generate the geographical location readings at the fastest rate, after which the AP may be configured to pass the geographical location readings to the MCU, which enables the MCU to generate the reference location information based on the geographical location readings, and add the GPS-not-required event to the event package data. Additionally, or alternatively, performing the sensor service process may include operating the GPS receiver in the power-saving mode if the GPS-not-required event is extracted from the event package data.

Then, as depicted in block 650, the GPS-fused location information and the selected one of the GPS-required event and the GPS-not-required event extracted from the event package data is obtained.

If it is determined in block 620, however, that GPS location information is requested (i.e., GPS-fused location information is not requested), the process may advance from block 620 to block 660, in which a location service process is performed to acquire geographical location readings from the GPS receiver to generate the GPS location information at a dynamic rate. Then, after block 650 or block 660, one of the GPS-fused location information and the GPS location information is selected as location output (block 670).

Figure 7A:
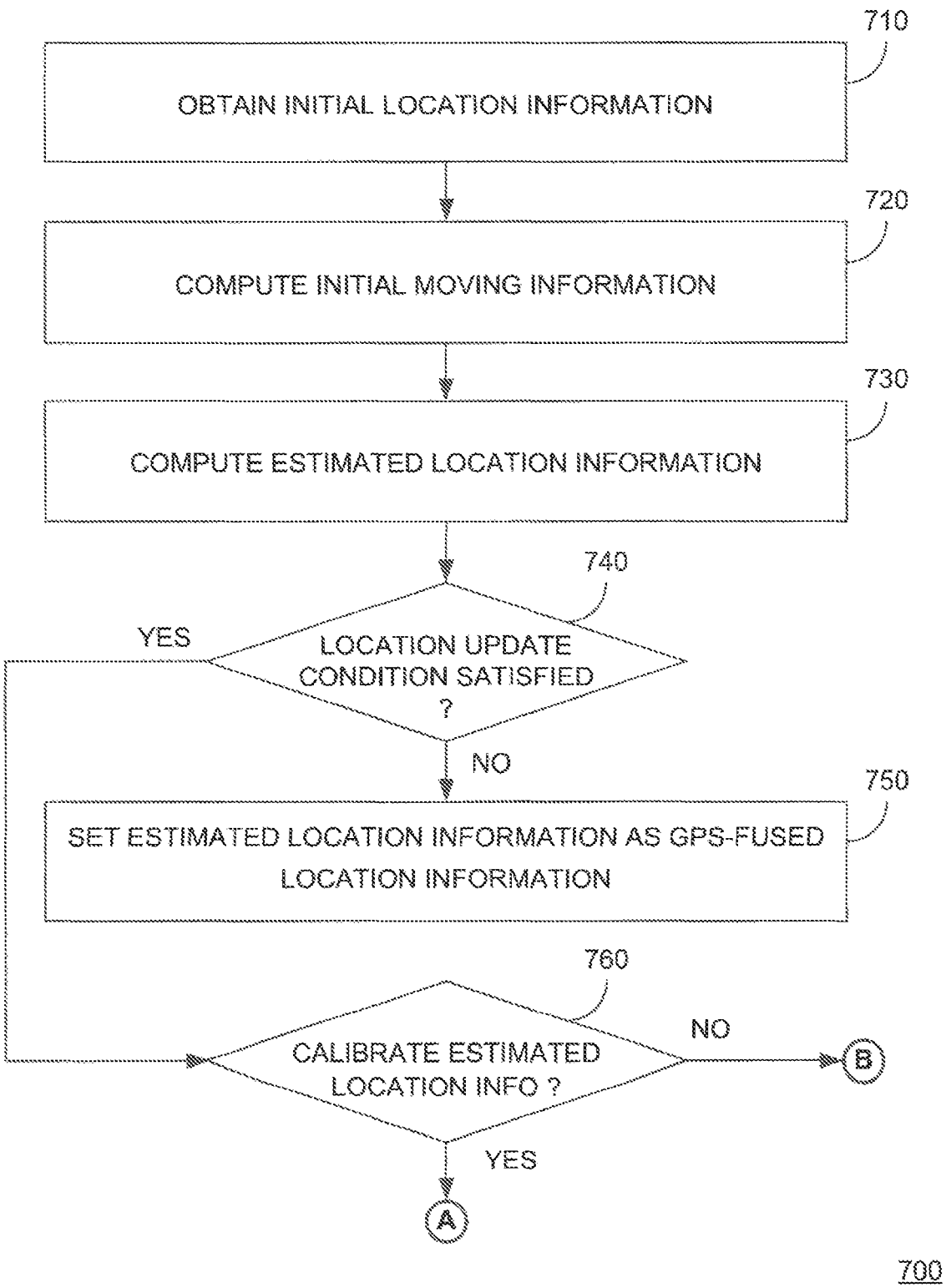
FIGS. 7A and 7B are flowcharts depicting another exemplary embodiment of a method.
Figure 7B:
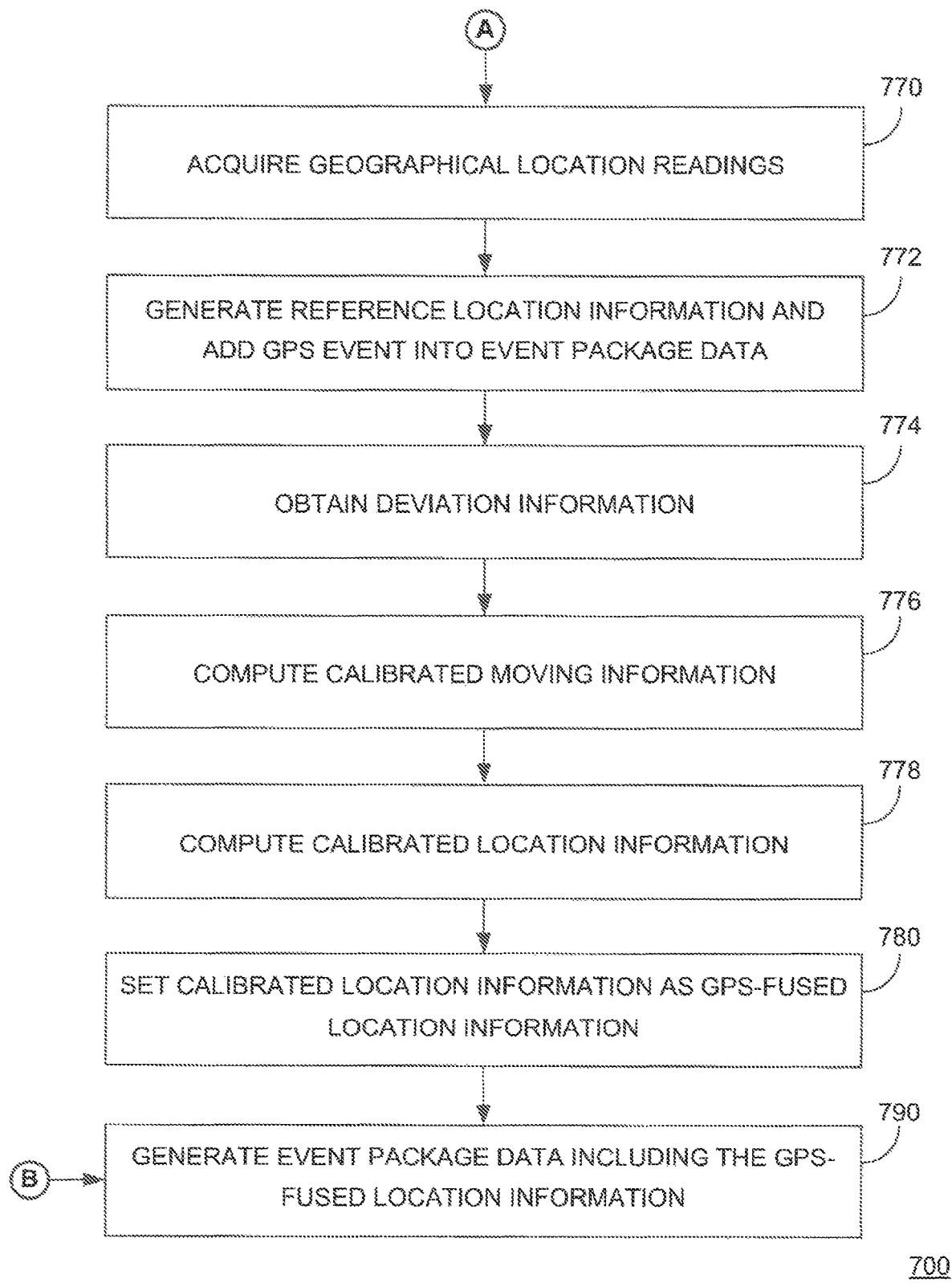

FIGS. 7A and 7B are flowcharts depicting another exemplary embodiment of a method, which corresponds to functionality exhibited by an embodiment of an MCU in response to GPS-fused location information being requested by an AP. With reference to FIGS. 7A and 7B, method 700 may be construed as beginning a block 710, in which initial location information is obtained. In block 720, initial moving information is computed based upon sensor readings (e.g., sensor reading from one or more of the inertial sensors). In block 730, estimated location information is computed based on the initial moving information and the initial location information, and then a determination is made as to whether a location update condition is satisfied (block 740). If the location update condition is not satisfied, the process proceeds to block 750, in which the estimated location information is set as the GPS-fused location information. If the location update condition is satisfied, a determination is made (in block 760) as to whether the estimated location information is to be calibrated. If the estimated location information is not to be calibrated, the process may proceed to block 790 (described below).

If the estimated location information is to be calibrated, the process described in blocks 770-780 is performed, as follows: the AP is informed to acquire geographical location readings (block 770); reference location information is generated based on the geographical location readings acquired, after which the MCU adds the GPS-not-required event into the event package data such that the application processor switches the GPS receiver into the power-saving mode (block 772); the estimated location information is compared with the reference location information to obtain a deviation information (block 774); a calibrated moving information is computed based on the estimated location information and the deviation information (block 776); a calibrated location information is computed based on the deviation information, calibrated moving information and the estimated location information (block 778); and the calibrated location information is set as the GPS-fused location information (block 780). Thereafter, such as depicted in block 790, the event package data including the GPS-fused location information is generated.

Figure 8:
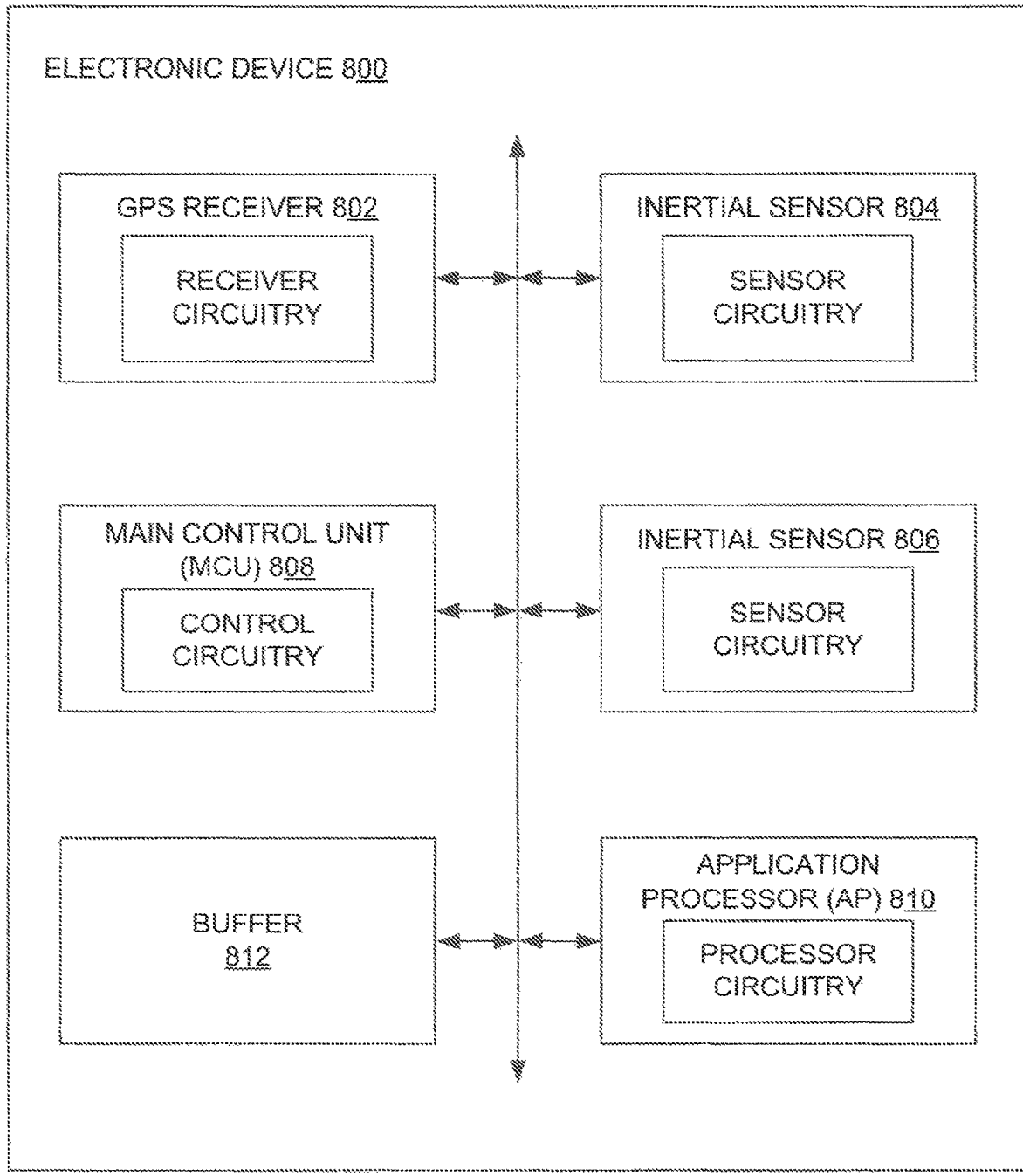
FIG. 8 is a schematic diagram of another exemplary embodiment of an electronic device.

FIG. 8 is a schematic diagram of another exemplary embodiment of an electronic device. As shown in FIG. 8, electronic device 800 (e.g., a mobile device) incorporates a GPS receiver 802, inertial sensors (e.g., sensor 804, 806), a main control unit (MCU) 808, an application processor (AP) 810, and a buffer 812. GPS receiver 802 includes receiver circuitry and is configured to switch between a location information-acquiring mode, during which the GPS receiver generates geographical location readings, and a power-saving mode, during which the GPS receiver is deactivated. Each of the inertial sensors includes sensor circuitry and is configured to generate sensor readings corresponding to sensed motion of the electronic device.

MCU 808 includes control circuitry and is configured to perform several functions. In particular, MCU 808 is configured to: determine reference location information; compute GPS-fused location information based on the reference location information and the sensor readings; generate a GPS-required event based on a change of the GPS-fused location information; and, generate a GPS-not-required event responsive to the reference location information being determined as unchanged.

AP 810 includes processor circuitry and also is configured to perform several functions. In particular, AP 810 is configured to: receive the GPS-fused location information and one of either the GPS-required event or the GPS-not-required event; responsive to the GPS-required event being received, operate the GPS receiver in the location information-acquiring mode to generate the geographical location readings; and, responsive to the GPS-not-required event being received, operate the GPS receiver in the power-saving mode. In some embodiments, buffer 812, which communicates with AP 810, is located outside AP 810.

Recalling that one of GPS-fused location information or GPS location information may be selectively requested by an AP, in this embodiment, after the GPS-fused location information is requested, AP 810 switches between a sleep mode and a wake-up mode. In particular, when AP 810 is operated in the sleep mode, MCU 808 continuously stores a sequence of the GPS-fused location information in buffer 812, until the MCU sets an interrupt event. Such an interrupt event may be associated with any of: a batch time-out event; a buffer-full warning event; and, generation of the GPS-required event. Notably, in response to an interrupt event, AP 810 switches to the wake-up mode to retrieve the stored sequence of the GPS-fused location information from buffer 812.

The disclosure also provides a non-transitory computer readable medium, which records computer program to be loaded into an electronic apparatus to execute the steps of the proposed method. The computer program is composed of a plurality of program instructions (for example, an organization chart, establishing program instruction, a table approving program instruction, a setting program instruction, and a deployment program instruction, etc), and these program instructions are loaded into the electronic apparatus and executed by the same to accomplish various steps of the proposed method.

No element, act, or instruction used in the detailed description of disclosed embodiments of the present application should be construed as geographically critical or essential to the disclosure unless explicitly described as such. Also, as used herein, each of the indefinite articles "a" and "an" can include more than one item. If only one item is intended, the terms "a single" or similar languages can be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
   a GPS receiver, having receiver circuitry, configured to switch between a location information-acquiring mode, during which the GPS receiver generates geographical location readings, and a power-saving mode, during which the GPS receiver is deactivated;
   inertial sensors, having sensor circuitry, configured to generate sensor readings corresponding to sensed motion of the electronic device;

a main controller (MCU) and an application processor, wherein the MCU controls the application processor to selectively operate the GPS receiver in either the location information-acquiring mode or the power-saving mode;

the MCU having control circuitry, configured to:

use a plurality of the geographical location readings to determine a reference location information responsive to the plurality of the geographical location readings converging or variance among the plurality of the geographical location readings corresponding to a variance threshold;

generate a GPS-not-required event responsive to the reference location information being determined;

compute a GPS-fused location information based on the sensor readings and, when determined, the reference location information;

provide, to the application processor, the GPS-fused location information;

generate a GPS-required event based on a change of the GPS-fused location information; and provide, to the application processor, only one of either the GPS-required event or the GPS-not-required event;

the application processor, having processor circuitry, configured to:

receive, from the MCU, the GPS-fused location information;

receive, from the MCU, the only one of either the GPS-required event or the GPS-not-required event;

responsive to the GPS-required event being received from the MCU, operate the GPS receiver in the location information-acquiring mode to generate next geographical location readings; and responsive to the GPS-not-required event being received from the MCU, operate the GPS receiver in the power-saving mode during which the GPS receiver is deactivated, after which the GPS receiver is operated in the location information-acquiring mode responsive to a subsequent GPS-required event being received from the MCU.

2. The electronic device of claim 1, wherein the GPS receiver is configured to generate the geographical location readings at a dynamic rate when in the location information-acquiring mode.

3. The electronic device of claim 1, wherein the GPS receiver is configured to generate the geographical location readings as designated by the application processor, at a fastest rate for which the application processor is configured to request the geographic location readings, when in the location information-acquiring mode.

4. The electronic device of claim 1, wherein the MCU is configured to determine the reference location information responsive to the geographical location readings converging.

5. The electronic device of claim 1, wherein the MCU is further configured to generate event package data, comprising the GPS-fused location information and the only one of the GPS-required event or the GPS-not-required event.

6. The electronic device of claim 5, wherein the application processor is further configured to:

selectively request one of the GPS-fused location information or GPS location information;

receive the event package data;

perform a location service process to switch the GPS receiver between the power-saving mode and the location information-acquiring mode based on the only one of the GPS-required event or the GPS-not-require event received with the event package data;

for the GPS-fused location information being requested, perform a sensor service process to inform the MCU to compute the GPS-fused location information, wherein the application processor is further configured to obtain the GPS-fused location information and the selected one of the GPS-required event and the GPS-not-required event extracted from the event package data;

for the GPS location information being requested, perform the location service process to acquire the geographical location readings from the GPS receiver to generate the GPS location information at a dynamic rate; and select one of the GPS-fused location information and the GPS location information as location output.

7. The electronic device of claim 6, wherein the sensor service process is further configured to:

if the GPS-require event is extracted from the event package data, inform the location service process to operate the GPS receiver in the location information-acquiring mode to generate the geographical location readings at the fastest rate, after which the application processor passes the geographical location readings to the MCU, and the MCU generates the reference location information based on the geographical location readings, and adds the GPS-not-required event to the event package data; and if the GPS-not-required event is extracted from the event package data, operate the GPS receiver in the power-saving mode.

8. The electronic device of claim 6, wherein:

if the GPS-required event is extracted from the event package data, the application processor acquires the geographical location readings from the GPS receiver; and the geographical location readings comprise latitude readings, longitude readings, and accuracy readings.

9. The electronic device of claim 6, wherein, responsive to the GPS-fused location information being requested, the MCU is configured to:

obtain initial location information;

compute initial moving information based upon the sensor readings;

compute estimated location information based on the initial moving information and the initial location information;

determine whether a location update condition is satisfied;

if the location update condition is not satisfied, set the estimated location information as the GPS-fused location information.

10. The electronic device of claim 9, wherein the MCU is configured to calibrate the estimated location information by performing the following:

inform the application processor to acquire geographical location readings if the location update condition is satisfied;

generate reference location information based on the geographical location readings acquired, after which the MCU adds the GPS-not-required event into the event package data such that the application processor switches the GPS receiver into the power-saving mode;

compare the estimated location information with the reference location information to obtain a deviation information;

compute a calibrated moving information based on the estimated location information and the deviation information;

compute a calibrated location information based on the deviation information, calibrated moving information and the estimated location information;
set the calibrated location information as the GPS-fused location information; and
generate the event package data including the GPS-fused location information.

11. The electronic device of claim 6, wherein, after the MCU adds the GPS-required event to the event package data, the application processor is configured to inject a sequence of geographical readings to the MCU at the fastest rate.

12. The electronic device of claim 11, wherein:
the electronic device further comprises a buffer outside the application processor;
after the GPS-fused location information is requested, the application processor switches from a wake-up mode to a sleep mode, such that the MCU continuously stores a sequence of the GPS-fused location information in the buffer when the application processor is operated in the sleep mode, until the MCU sets an interrupt event in response to: 1) a batch time-out event; 2) a buffer-full warning event; or, 3) generation of the GPS-required event, wherein after the MCU sets the interrupt event, the application processor switches to the wake-up mode to retrieve the stored sequence of the GPS-fused location information.

13. A method for providing location information with an electronic device having a GPS receiver, inertial sensors, a main controller (MCU), and an application processor (AP), the method comprising:
generating, by the inertial sensors, sensor readings corresponding to sensed motion of the electronic device;
determining, by the MCU, a reference location information using a plurality of geographical location readings from the GPS receiver responsive to the plurality of the geographical location readings converging or variance among the plurality of the geographical location readings corresponding to a variance threshold;
generating, by the MCU, a GPS-not-required event responsive to the reference location information being determined;
computing, by the MCU, a GPS-fused location information based on the sensor readings and, when determined, the reference location information;
providing, from the MCU to the AP, the GPS-fused location information;
generating, by the MCU, a GPS-required event based on a change of the GPS-fused location information;
providing, from the MCU to the AP, only one of either the GPS-required event or the GPS-not-required event;
receiving, by the AP, the GPS-fused location information;
receiving, by the AP, the only one of either the GPS-required event or the GPS-not-required event;
responsive to the GPS-required event being received by the AP, operating the GPS receiver in a location information-acquiring mode during which the GPS receiver generates geographical location readings; and
responsive to the GPS-not-required event being received by the AP, operating the GPS receiver in a power-saving mode during which the GPS receiver is deactivated, after which the GPS receiver is operated in the location information-acquiring mode responsive to a subsequent GPS-required event being received from the MCU such that the MCU controls the application processor to selectively operate the GPS receiver in either the location information-acquiring mode or the power-saving mode.

14. The method of claim 13, wherein operating the GPS receiver in the location information-acquiring mode comprises generating the geographical location readings at a dynamic rate.

15. The method of claim 13, wherein operating the GPS receiver in the location information-acquiring mode comprises generating the geographical location readings as designated by the AP, at a fastest rate for which the application processor is configured to request geographic location readings.

16. The method of claim 13, wherein determining the reference location information is performed responsive to the geographical location readings converging.

17. The method of claim 13, further comprising generating, by the MCU, event package data comprising the GPS-fused location information and the only one of the GPS-required event or the GPS-not-required event.

18. The method of claim 17, further comprising:
selectively requesting, by the AP, one of the GPS-fused location information or GPS location information;
receiving, by the AP, the event package data;
performing, by the AP, a location service process to switch the GPS receiver between the power-saving mode and the location information-acquiring mode based on the only one of the GPS-required event or the GPS-not-require event received with the event package data;
for the GPS-fused location information being requested:
performing a sensor service process, by the AP, to inform the MCU to compute the GPS-fused location information; and
obtaining the GPS-fused location information and the selected one of the GPS-required event and the GPS-not-required event extracted from the event package data;
for the GPS location information being requested:
performing the location service process to acquire the geographical location readings from the GPS receiver to generate the GPS location information at a dynamic rate; and
selecting one of the GPS-fused location information and the GPS location information as location output.

19. The method of claim 18, wherein performing the sensor service process further comprises:
if the GPS-require event is extracted from the event package data, informing the location service process to operate the GPS receiver in the location information-acquiring mode to generate the geographical location readings at the fastest rate, after which the application processor passes the geographical location readings to the MCU, and the MCU generates the reference location information based on the geographical location readings, and adds the GPS-not-required event to the event package data; and
if the GPS-not-required event is extracted from the event package data, operating the GPS receiver in the power-saving mode.

20. The electronic device of claim 18, further comprising:
if the GPS-required event is extracted from the event package data, acquiring the geographical location readings from the GPS receiver by the AP, wherein the geographical location readings comprise latitude readings, longitude readings, and accuracy readings.

21. The electronic device of claim 18, further comprising:
injecting, by the AP, a sequence of geographical readings to the MCU at the fastest rate after the MCU adds the GPS-required event to the event package data.

* * * * *